3,119,833
2-OXAZOLIDINONE 3-CARBANILIDES

Richard C Sovish, Midland, Mich., assignor to The Dow Chemical Company, Midland, Mich., a corporation of Delaware
No Drawing. Filed Dec. 1, 1961, Ser. No. 156,540
9 Claims. (Cl. 260—307)

This invention relates to new chemical compounds which are derivatives of 2-oxazolidinones.

Specifically, the compounds related to in the present invention are those having the formula:

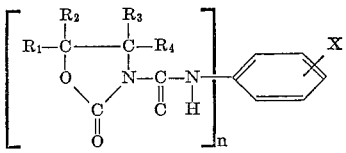

wherein each of $R_1$, $R_2$, $R_3$, and $R_4$ are either hydrogen or lower alkyl radicals, X is either hydrogen, a lower alkyl group, a lower alkoxy group, or a halogen having an atomic number from 17 to 35, and $n$ is an integer from 1 to 2.

The terms "lower alkyl" and "lower alkoxy" are used to denote those alkyl and alkoxy groups containing from 1 to about 4 carbon atoms.

The novel compounds are conveniently prepared by reacting a 2-oxazolidinone having the formula:

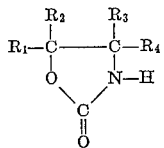

wherein $R_1$, $R_2$, $R_3$, and $R_4$ each have the same significance as previously described, with a phenyl isocyanate or substituted phenyl isocyanate having the formula:

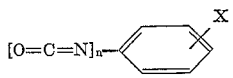

wherein X and $n$ have the same significance as previously described. Preferably, the reaction is conducted by employing a catalyst or by mild heating of the reaction mixture. The catalyst, when used, is suitably a weak base such as pyridine or triethylamine.

Although it is to be understood that the reacting of the oxazolidinone and the isocyanate in virtually any proportions will result in the formation of some of the desired product, equivalent molar quantities are preferred.

It is preferable but not necessary to employ a solvent for the reaction mixture. Suitable solvents include benzene, methylene chloride and chloroform.

At the conclusion of the reaction, the novel oxazolidinone derivative is separated from the reaction mixture, as by filtration, and may be purified by recrystallization if desired.

The practice of the present invention is illustrated by a series of experiments in each of which 2-oxazolidinone or a substituted 2-oxazolidinone was reacted with phenyl isocyanate or a substituted phenyl isocyanate to prepare the corresponding oxazolidinone-isocyanate adduct. In some of the experiments, a small quantity of triethylamine was added as a catalyst, and in the remaining experiments the reactants were warmed on a steam bath for 1–2 hours. There are shown in Table I the oxazolidinone-phenyl-isocyanate adducts prepared from the corresponding 2-oxazolidinones and phenyl-isocyanates, with melting points of the products and the yields obtained, based on the quantities of reactants used.

Table I

| Experiment | Product | Melting Point, °C. | Yield, Percent |
|---|---|---|---|
| 1 | 2-Oxo-3-oxazolidinecarboxanilide | 114–115 | 82 |
| 2 | 5-Methyl-2-oxo-3-oxazolidinecarboxanilide | 139–140 | 76 |
| 3 | 5,5-Dimethyl-2-oxo-3-oxazolidinecarboxanilide | 152–153 | 69 |
| 4 | 5-Ethyl-2-oxo-3-oxazolidinecarboxanilide | 113–114 | 57 |
| 5 | 5-Methyl-4'-chloro-2-oxo-3-oxazolidinecarboxanilide | 130–132 | 40 |
| 6 | 4'-Methoxy-2-oxo-3-oxazolidinecarboxanilide | 143–144 | 50 |
| 7 | 5-Methyl-4'-methoxy-2-oxo-3-oxazolidinecarboxanilide | 138–139 | 37 |
| 8 | N,N'-(4-methyl-m-phenylene) bis (5-methyl-3-oxazolidinecarboxamide)[1] | 195–197 |  |

[1] For this experiment, two moles of oxazolidinone and one mole of phenylene diisocyanate were used.

The compounds of the present invention have shown varied utilities, such as parasiticides, as agents for killing mice, as pre-emergent herbicides, as post-emergent herbicides, as agents for killing aquatic weeds, as seedicides, as plant insecticides, and as anthelmintics for treatment of mice and swine. Examples of these utilities include:

Each of the compounds prepared in Experiments 1, 4, and 5, when used separately in concentrations of 300 parts per million, effected a 100 percent kill of numerous specimens of roundworm.

The compound prepared in Experiment 1, when used in a concentration of 100 parts per million, effected a 100 percent kill of numerous specimens of white mice.

Each of the compounds prepared in Experiments 2, 3, 4, and 7, when evaluated as pre-emergent herbicides and employed separately in concentrations of 50 pounds per acre, showed at least 75 percent control of sorghum milo. In addition, the compound of Experiment 3, when used in this same concentration, effected a 70 percent control of German millet.

The compound prepared in Experiment 7, when evaluated as a post-emergent herbicide and used in a concentration of 0.4 weight percent, effected a 50 percent control of a series of tomato plant specimens.

The compound prepared in Experiment 8, when evaluated as an aquatic weed killer in concentrations of 10 parts per million, showed 75 percent control, 50 percent control and 50 percent control of waterplant elodia, waterplant moneyort, and waterplant salvinia, respectively, in three series of separate tests.

The compound prepared in Experiment 8, when evaluated as a seedicide, and used in a concentration of 100 parts per million, effected a 60 percent kill of specimens of pigweed seeds.

The compound prepared in Experiment 2, when evaluated as a plant insecticide and employed in a concentration of 500 parts per million, showed a 50 percent control of bean aphids.

The compounds prepared in Experiments 2, 4, and 6, when tested for control of pig ascarides in mice and employed in concentrations of from .06 to .25 weight percent of the diet, effected kills of 50 percent, 100 percent, and 100 percent respectively, in three series of tests.

In addition, each of the compounds prepared in Experiments 4 and 6, when tested for control of the mouse tapeworm and employed in concentrations of from .06 to .12 weight percent of the diet, effected a 100 percent kill in two series of tests.

I claim:
1. A compound of the formula:

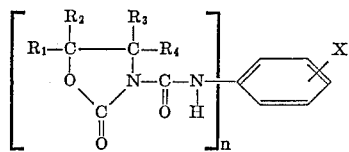

wherein $R_1$, $R_2$, $R_3$, and $R_4$ are each independently selected from the group consisting of hydrogen and lower alkyl radicals, X is selected from the class consisting of hydrogen, lower alkyl radicals, lower alkoxy radicals, and a halogen having an atomic number from 17 to 35, and $n$ is an integer from 1 to 2.

2. 2-oxo-3-oxazolidinecarboxanilide.
3. 5-methyl-2-oxo-3-oxazolidinecarboxanilide.
4. 5,5-dimethyl-2-oxo-3-oxazolidinecarboxanilide.
5. 5-ethyl-2-oxo-3-oxazolidinecarboxanilide.
6. 5 - methyl - 4' - chloro - 2 - oxo - 3 - oxazolidinecarboxanilide.
7. 4'-methoxy-2-oxo-3-oxazolidinecarboxanilide.
8. 5 - methyl - 4' - methoxy - 2 - oxo - 3 - oxazolidinecarboxanilide.
9. N,N' - (4 - methyl - m - phenylene)bis(5 - methyl-3-oxazolidinecarboxamide).

References Cited in the file of this patent

Henry et al.: J. Am. Chem. Soc., vol. 71, pages 2297–2300 (1949).